(12) United States Patent
Sasame et al.

(10) Patent No.: US 6,493,519 B2
(45) Date of Patent: Dec. 10, 2002

(54) IMAGE FORMING APPARATUS HAVING A PLURALITY OF IMAGE FORMING STATIONS, AND UNIT DETACHABLY MOUNTABLE ON THE APPARATUS

(75) Inventors: Hiroshi Sasame, Numazu (JP); Hiroaki Ogata, Shizuoka-ken (JP); Shinya Yamamoto, Numazu (JP); Tomomi Kakeshita, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/769,327

(22) Filed: Jan. 26, 2001

(65) Prior Publication Data

US 2001/0022900 A1 Sep. 20, 2001

(30) Foreign Application Priority Data

Jan. 28, 2000 (JP) ......................................... 2000-020932

(51) Int. Cl.[7] .......................... G03G 15/00; G03G 21/16
(52) U.S. Cl. .......................................... 399/25; 399/111
(58) Field of Search ............................... 399/24, 25, 26, 399/27, 45, 111, 116, 299, 396, 12, 13, 112

(56) References Cited

U.S. PATENT DOCUMENTS

| 4,961,088 A | * | 10/1990 | Gilliland et al. | 399/25 |
| 5,572,292 A | * | 11/1996 | Chatani et al. | 399/25 |
| 5,689,760 A | * | 11/1997 | Suzuki et al. | 399/45 |
| 5,778,279 A | * | 7/1998 | Kawai et al. | 399/26 X |
| 6,205,298 B1 | * | 3/2001 | Yamamoto | 399/25 |

* cited by examiner

*Primary Examiner*—Sandra Brase
(74) *Attorney, Agent, or Firm*—Fitzpatrick, Cella, Harper & Scinto (57) ABSTRACT

The present invention provides an image forming apparatus that has a plurality of image forming stations for forming an image on a recording material, each of the plurality of image forming stations having a memory, and writing device for writing data into the memories, wherein when the image is formed on the recording material without at least one of the image forming stations being used, the writing device writes use data into the memory of the station used and the memory of the station not used.

20 Claims, 6 Drawing Sheets

IMAGE FORMING APPARATUS HAVING A PLURALITY OF IMAGE FORMING STATIONS, AND UNIT DETACHABLY MOUNTABLE ON THE APPARATUS

BACKGROUND OF THE INVENTION

1. Field of the Invention

This invention relates to an image forming apparatus such as a copier or a printer, and particularly to an image forming apparatus for forming a layered image like a color image on a recording material by the utilization of a plurality of image forming stations and a unit detachably mountable on such apparatus.

2. Related Background Art

Figure 5:
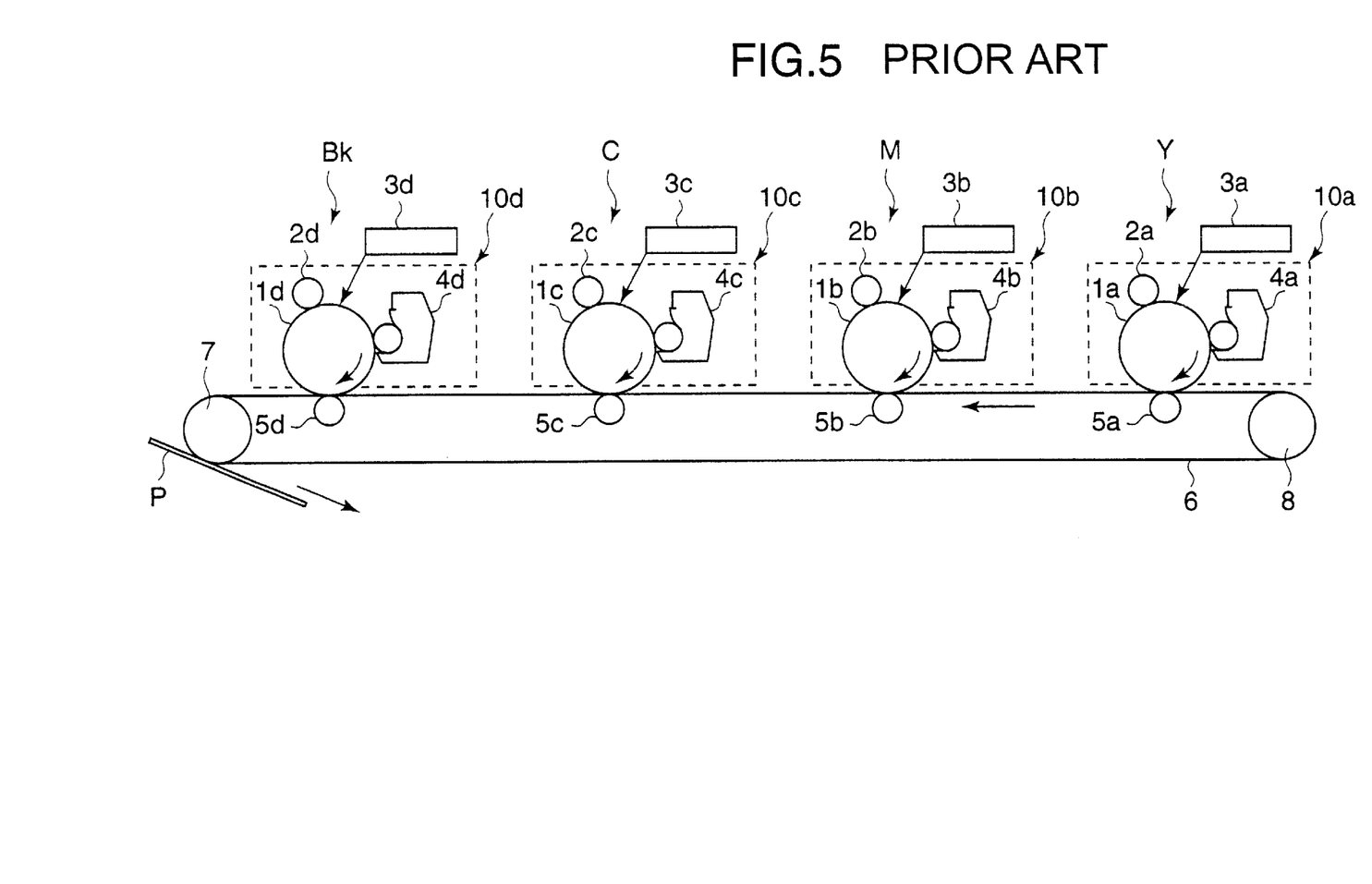
FIG. 5 shows the general construction of an image forming apparatus according to the prior art.

Reference is had to FIG. 5 of the accompanying drawings to describe an example of the construction of an image forming apparatus of the electrophotographic type for obtaining multicolored images, i.e., a so-called color image forming apparatus.

The color image forming apparatus shown in FIG. 5 is a color image forming apparatus of the so-called four-drum type, and a rotary transferring member, i.e., an intermediate transferring belt 6 in the present example, is passed over a driving roller 7 and a driven roller 8, and is rotated in the direction of arrow. Color image forming stations Y, M, C and Bk for yellow, magenta, cyan and black, respectively, are provided along the direction of movement of the intermediate transferring belt 6, and accordingly, four photosensitive drums 1 (1a to 1d) which are image bearing members are disposed in succession on the upper side of the moving intermediate transferring belt 6.

Around the photosensitive drums 1 (1a to 1d), there are installed image forming means such as charging means 2 (2a to 2d), laser scanners 3 (3a to 3d) as exposing means, and developing means 4 (4a to 4d) provided with developing rollers and containing developers (toners) of the respective colors therein. The image forming means of the respective colors are similar in construction to one another with the exception that Y, M, C and Bk toners are contained in the developing containers of the developing means 4a to 4d. Also, the photosensitive drum 1, the charging means 2 and the developing means 4 are made into a unit (cartridge) which is detachably mountable on the main body of the apparatus.

Toner images of the respective colors developed on the respective drums 1a to 1d by the developing means 4a to 4d are successively transferred onto the intermediate transferring belt 6 by the use of transferring means 5 (5a to 5d), and a full color image is obtained by the toners of four colors, i.e., yellow, magenta, cyan and black.

In the color image forming apparatus in the present example, no cleaning mechanisms are disposed around the photosensitive drums 1a to 1d, and this is because this apparatus adopts a cleaner system for collecting untransferred toners by the developing means 4a to 4d simultaneously with developing, and thereby, the downsizing and reduced cost of the apparatus become possible and further, it becomes possible to extend the life of the photosensitive drums because no cleaning blades frictionally contact with the photosensitive drums.

Description will now be made of the image forming operation of the color image forming apparatus constructed as described above.

A laser beam modulated in conformity with image data from a host apparatus such as a personal computer is applied by the exposing means 3a to 3d to the surfaces of the photosensitive drums 1a to 1d uniformly charged by charging rollers which are the charging means 2a to 2d, whereby desired electrostatic latent images are formed for the respective colors. These latent images are reversal-developed and visualized as toner images in developing regions by the developing means 4a to 4d which are developing apparatuses disposed in opposed relationship with the photosensitive drums 1a to 1d and containing the toners of the respective colors therein. These toner images are successively transferred to the intermediate transferring belt 6, and are further transferred to a recording medium P fed by sheet feeding means (not shown) and conveyed by conveying means. These color toner images are melted and fixed by a fixing apparatus (not shown), and are permanently fixed on the recording medium P, whereby a desired color print image is obtained.

Figure 6:
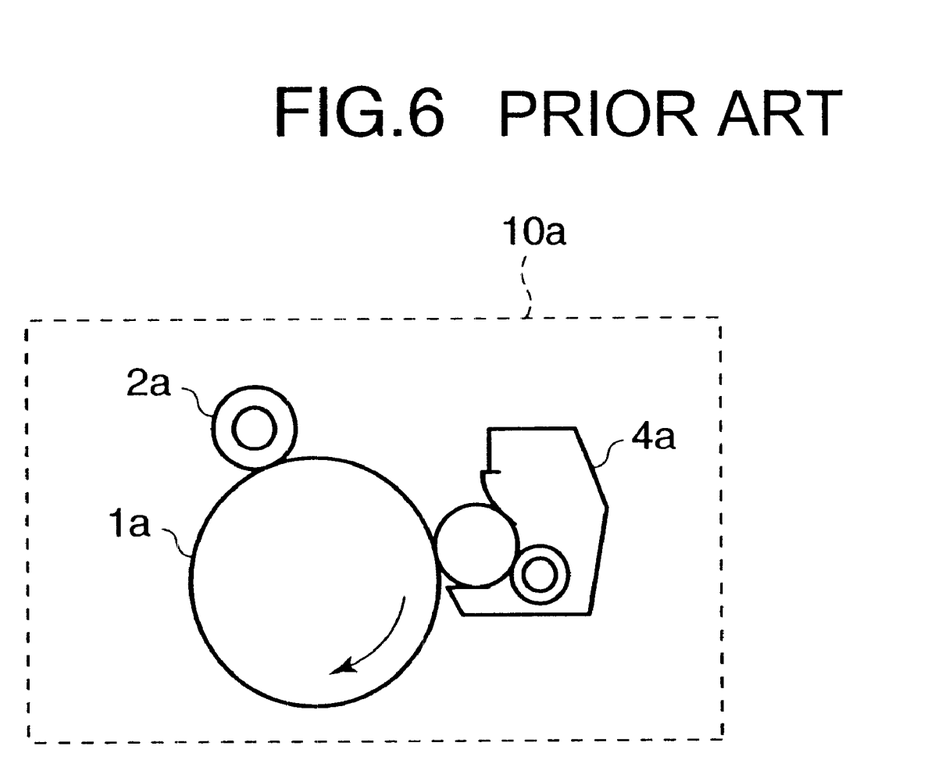
FIG. 6 schematically shows the construction of a process cartridge according to the prior art.

In the color image forming apparatus shown in FIG. 5, the photosensitive drums 1a to 1d, charging means 2a to 2d and developing means 4a to 4d which are the image forming means are made integral with one another to assume the form of process cartridges 10a to 10d as shown in FIG. 6 of the accompanying drawings. The process cartridges 10a to 10d are made detachably mountable on the main body of the apparatus by cartridge mounting means (not shown).

In the color image forming apparatus of the above-described construction, provision is made of means for detecting the amount of remaining toner in each of the cartridges 10a to 10d, and when the toner in a cartridge of a certain color has become null and that cartridge has come to the end of its life, it is made possible to continuedly use the apparatus by a user simply interchanging that cartridge, and the maintenance by a serviceman as done in a copier or the like becomes unnecessary.

Also, for example, the photosensitive drums 1a to 1d, charging means 2a to 2d and developing means 4a to 4d which are image forming means are made integral with one another to form cartridges, whereby there is born the merit that stable and good images free of inconvenience can always be obtained until the end of the life of the cartridges and moreover, the user can easily effect the interchange of any cartridge when it has come to the end of its life.

However, in the color image forming apparatus of the construction as described above, image formation using four colors is not always effected, but image formation of single black color is effected in the case of black-and-white images and besides, image formation by various modes such as a two-color mode using only yellow and magenta, and a three-color mode using yellow, magenta and cyan is effected.

That is, there are a four-color mode using four colors, a three-color mode using only three colors of four colors, a two-color mode using only any two colors of four colors, and a single color mode using any one of four colors.

Here, the single color mode will be described as an example. Usually, image formation (printing) is effected in a full color mode (four-color mode), and a speed difference is given between the photosensitive drums and the intermediate transferring belt to thereby secure a good transferring property and obtain a good image.

Next, when for example, a monochromatic image of a single black color is to be formed, the other image forming means than for black are not operated, and a similar image forming operation is performed with the intermediate transferring belt 6 and the photosensitive drums 1a to 1c spaced apart from one another by a mechanism, not shown. In this case, however, the construction of the apparatus becomes complicated and the cost thereof becomes very high or the apparatus becomes bulky.

So, in the case of the single black mode, it is practised that the intermediate transferring belt 6 is not spaced apart and the photosensitive drums 1a, 1b and 1c of the other colors continue to be rotated. In this case, there is not the problem of the increased cost of the apparatus, but yet it is conceivable that not only the photosensitive drum 1d concerned in image formation but the drums 1a to 1c not concerned in image formation are worn by the intermediate transferring belt 6 and the end of the life of the photosensitive drums is hastened.

In such a case, the black cartridge is concerned in image formation and therefore, it has been relatively easy to control the life thereof and it can be precisely reported to the user, but the cartridges of the other colors are not concerned in image formation and therefore, an error has occurred to the time for controlling the life thereof and the end of the life could not be sometimes precisely reported to the user.

Also, there have been cases where when a problem has arisen on the part of the user, the reason therefor cannot be understood well even if an attempt is made to analyze why the problem has arisen.

Further, in the color image forming apparatus of the above-described construction, a system for changing the process speed, like e.g. OHP sheets, and making transmissivity good has been put into practical use.

In such a case, there is no problem if there can be adopted such a construction that only the speed of the fixing apparatus is changed, but the downsizing and lower cost of the apparatus are sought after, whereby the distance between the transferring means and the fixing apparatus cannot be made as long as the size of e.g. OHP sheet and therefore, there has been proposed a system for changing the process speed of the image forming operation itself (the image forming speed).

Again in the color image forming apparatus of such a construction, each constituent portion is designed so as not to affect the life of the photosensitive drums as much as possible, but the influence cannot be completely eliminated, and though slightly, the life of the photosensitive drums is affected, or has been affected by an accident, for example, the use of unexpected OHP sheets or the like.

In such a case, heretofore, an error occurred when the life was controlled and it could not sometimes be precisely reported to the user.

Also, when there arose a problem on the part of the user, there was a case where the reason for the problem could not be understood well even if an attempt was made to analyze it.

SUMMARY OF THE INVENTION

The present invention has been made in view of the above-noted problems, and an object thereof is to provide an image forming apparatus which is high in cartridge life control accuracy.

Another object of the present invention is to provide an image forming apparatus comprising:

a plurality of image forming stations for forming an image on a recording material, each of the plurality of image forming stations having a memory; and writing means for writing data into the memories;

wherein when the image is formed on the recording material without at least one of the image forming stations being used, the writing means writes use data into the memory of the station used and the memory of the station not used.

Still another object of the present invention is to provide a unit mounted on an image forming apparatus on which a first unit and a second unit are mountable, the unit comprising:

a memory;

wherein the memory stores therein the use data when an image is formed by use of at least the first unit, and the use data when an image is formed by use of not the first unit but the second unit.

Yet still another object of the present invention is to provide an image forming apparatus comprising:

an image forming station for forming an image on a recording material, the image forming station having a memory; and writing means for writing data into the memory;

wherein the image forming station can form an image at at least two kinds of speeds, and the writing means writes use data into the memory for each of the image forming speeds.

Still a further object of the present invention is to provide a unit comprising:

a memory;

wherein the memory stores therein use data for each image forming speed.

Further objects of the present invention will become apparent from the following detailed description when read with reference to the accompanying drawings.

DESCRIPTION OF THE PREFERRED EMBODIMENTS

An image forming apparatus according to the present invention and a cartridge detachably mountable on this image forming apparatus will hereinafter be described in greater detail with reference to the drawings.

Embodiment 1

Figure 1:
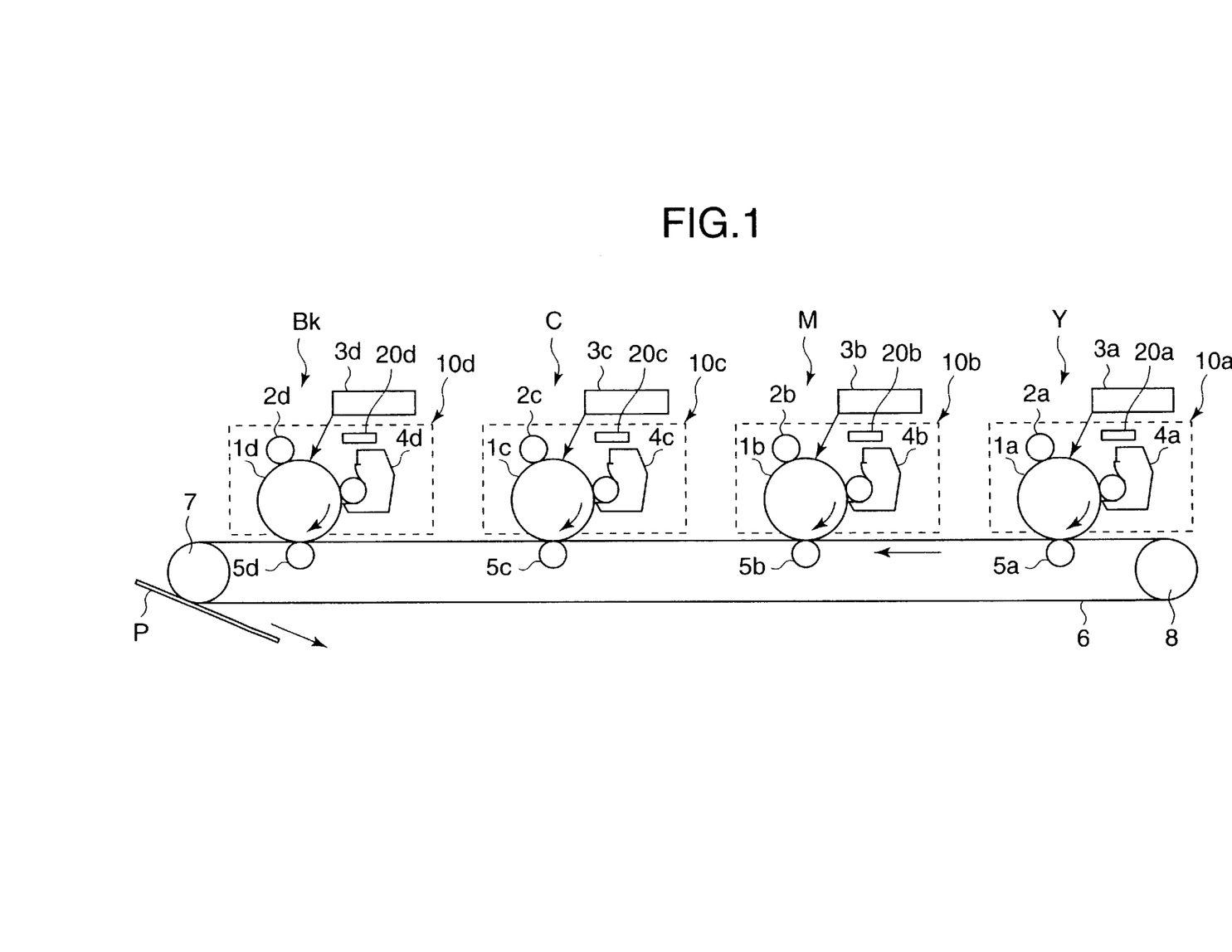
FIG. 1 shows the general construction of an embodiment of an image forming apparatus according to the present invention.

FIG. 1 shows an embodiment of the image forming apparatus according to the present invention. In this embodiment, the image forming apparatus of the present invention is similar in construction to the color image forming apparatus of the in-line type previously described with reference to FIGS. 5 and 6, and the constructionally and functionally same members are given the same reference characters and need not be described in detail.

Figure 2:
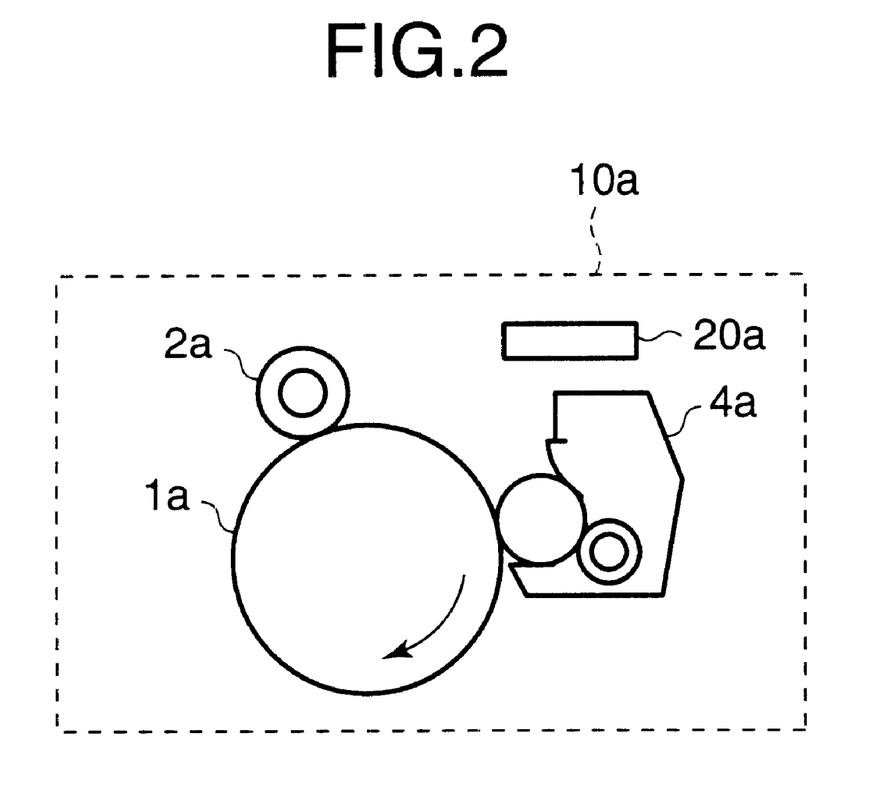
FIG. 2 schematically shows the construction of an embodiment of a process cartridge according to the present invention.

Again in the electrophotographic color image forming apparatus according to the present embodiment, photosensitive drums 1a to 1d, charging means 2a to 2d and developing means 4a to 4d which are image forming means of respective colors are made integral with each other to assume the form of process cartridges 10(10a to 10d) as shown in FIG. 2. These process cartridges 10a to 10d are detachably mounted with respect to cartridge mounting means (not shown) provided in the main body of the image forming apparatus by the user.

In the color image forming apparatus according to the present embodiment, no cleaning means are disposed around the photosensitive drums 1a to 1d, as described above, and this is because this apparatus adopts the cleaner system for collecting untransferred toners by the developing means simultaneously with developing. However, it is also possible to provide cleaning means provided with cleaning blades, and integrally incorporate such cleaning means also into the process cartridge 10a to 10d.

According to the present invention, memory means 20 (20a to 20d) are carried on the respective process cartridges 10a to 10d.

As the memory means, i.e., memories 20, used in the present invention, use can be limitlessly made of ordinary electronic memories by semiconductors such as a combination of nonvolatile memories or volatile memories and backup batteries. Particularly, when the memories 20 are non-contact memories which effect data communication between the memories 20 and read-out/write-in IC by an electromagnetic wave, the cartridge side transmitting portion and the main body control portion may be in non-contact with each other and therefore, the possibility of bad contact depending on the mounted state of the process cartridge 10 becomes null and highly reliable control can be effected.

Description will now be made of the four-color (full color mode) image forming operation of the color image forming apparatus of the above-described construction.

A laser beam modulated in conformity with image data from a host apparatus such as a personal computer is applied, by the exposing means 3a to 3d, to the surfaces of the photosensitive drums 1a to 1d uniformly charged by charging rollers which are the charging means 2a to 2d, whereby desired electrostatic latent images are formed for the respective colors.

These latent images are reversal-developed in developing regions and visualized as toner images by the developing means 4a to 4d which are developing apparatuses disposed in opposed relationship with the photosensitive drums and containing toners of the respective colors therein. These toner images are successively transferred to an intermediate transferring belt 6 as a transferring member in the order of yellow (Y), magenta (M), cyan (C) and black (Bk), and color toner images are formed on the intermediate transferring belt 6. According to the present invention, at this time, the numbers of prints are stored in the memories 20a to 20d installed in the respective cartridges 10a to 10d.

The toner images on the intermediate transferring belt 6 are transferred to a recording medium P fed by sheet feeding means, not shown, and conveyed by conveying means. The color toner images on the recording medium P are melted and fixed by a fixing apparatus, not shown, and are permanently fixed on the recording medium P, whereby a desired color print image is obtained.

When in the above-described color image forming apparatus, image formation (printing) by a black single color mode is to be effected, the black station, i.e., the black process cartridge, effects image formation as usual, but the other color stations, i.e., the process cartridges 10a, 10b and 10c of yellow, magenta and cyan which are non-print colors, do not effect image formation. In the present embodiment, however, the intermediate transferring belt 6 is not designed to be spaced apart to a released position and therefore, all the photosensitive drums 1a to 1d are rotated while being in contact with the belt 6.

As described above, in the non-print color stations Y, M and C, the image forming operation including charging and exposure is not performed and therefore the damage to the photosensitive drums is much smaller than in the black station Bk which effects image formation, but the photosensitive drums 1a, 1b and 1c are rotated and in fact, there is more or less influence.

Thus, according to the present embodiment, in the case of the above-described black single color mode, the number of black prints is stored in the memory 20d of the process cartridge 10d for black, and "the numbers of sheets printed in the other colors" are also stored in the memories 20a, 20b and 20c of the process cartridges 10a, 10b and 10c for the other colors, i.e., yellow, magenta and cyan.

As the contents of memory to be stored, for example, in the memories 20a, 20b and 20c of the process cartridges 10a, 10b and 10c for yellow, magenta and cyan, the number of sheets printed by the use of the magenta cartridge 10b and the number of sheets printed by the black single color mode although the magenta cartridge 10b is not used for printing are stored, for example, in the memory 20b of the magenta cartridge 10b.

If the information stored in the memory 20b of the magenta cartridge 10b is utilized, and if it is known in advance that "when for example, 1,000 sheets are printed by the black single color mode, the degree of consumption of the photosensitive drum of the magenta cartridge becomes the same as that when it has been used for a sheet", it will become possible to accurately represent the life of the magenta cartridge 10b by using this coefficient. Such information can be displayed, for example, on the display means of the image forming apparatus, or can be transmitted to and displayed on the display means of a host computer or the like.

Also, even if the above-mentioned information is not used for the calculation of the life of the magenta cartridge 10b, when the badness of the magenta cartridge 10b happens to the user and the cartridge is returned, it becomes easy to analyze the badness by the above-mentioned information.

Embodiment 2

While in Embodiment 1, description has been made of the image formation by the black single color mode, the description also holds true of the image formation by the two-color mode and the three-color mode, and when image formation is to be effected by the two-color mode using, for example, cyan and magenta, the numbers of sheets on which image formation has been effected in the other colors are pre-stored in the memories 20a and 20d of the process cartridges 10a and 10d for yellow and black. That is, at least the number of prints when image formation has been effected by the use of the yellow cartridge and the number of prints when image formation has been effected without the use of the yellow cartridge are stored in the memory 20a of the yellow cartridge. Likewise, two kinds of numbers of prints are stored in the memory 20d of the black cartridge.

Again in the present embodiment, an operational effect similar to that of Embodiment 1 can be achieved.

Embodiment 3

This embodiment will be described with respect to a case where the image forming apparatus has image forming modes by a plurality of image forming speeds. According to the present embodiment, in the image forming apparatus described in Embodiment 1, OHP is used as the recording medium P.

For OHP, in order to make the light transmissivity after fixing good, image formation is effected with the process speed (image forming speed) of the entire apparatus reduced to ⅓ of the ordinary process speed.

According to the present embodiment, when image formation has been effected with OHP used as the recording medium P, it is stored in the memories 20a to 20d of the respective process cart ridges that image formation has been effected at a speed of ⅓. As a matter of course, the memories 20a to 20d also store therein the numbers of prints at the ordinary speed.

By such a construction, as in Embodiment 1, it becomes possible to accurately control the life of the cartridges. Also, even if a problem has arisen on the part of the user, it becomes useful for the analysis as to why the badness has happened.

Also, the number of prints when the cartridges have been used and the number of prints when the cartridges have not been used as shown in Embodiments 1 and 2 may be stored for each process speed.

Embodiment 4

While in Embodiment 3, the case where OHP is used as the recording medium P has been shown, particularly in the color image forming apparatus, there are also a thick paper mode by which even thick paper can be properly fixed, and a high gloss mode which is used when it is desired to gloss.

These are designed such that in the image formation by any mode, fixing is sufficiently effected with the process speed reduced to e.g. ½. Again in the image formation by these modes, as in Embodiment 3, it is stored in the memories 20a to 20d of the process cartridges 10a to 10d that image formation has been effected at a speed of ½.

By such a construction, as in Embodiment 1, it becomes possible to accurately control the life of the cartridges. Also, even if a problem has arisen on the part of the user, it becomes useful for the analysis as to why the badness has happened.

Embodiment 5

While in each of the above-described embodiments, the process cartridges 10 (10a to 10d) in the image forming apparatus of the present invention have been described as the photosensitive drums 1a to 1d, the charging means 2a to 2d, the developing means 4a to 4d and further, cleaning means made integral with one another, this is not restrictive, but the process cartridges 10 (10a to 10d), as described above, may be at least the developing means 4a to 4d and the electrophotographic photosensitive bodies 1a to 1d integrally made into cartridges which are detachably mountable with respect to the main body of an electrophotographic image forming apparatus.

Figure 3:
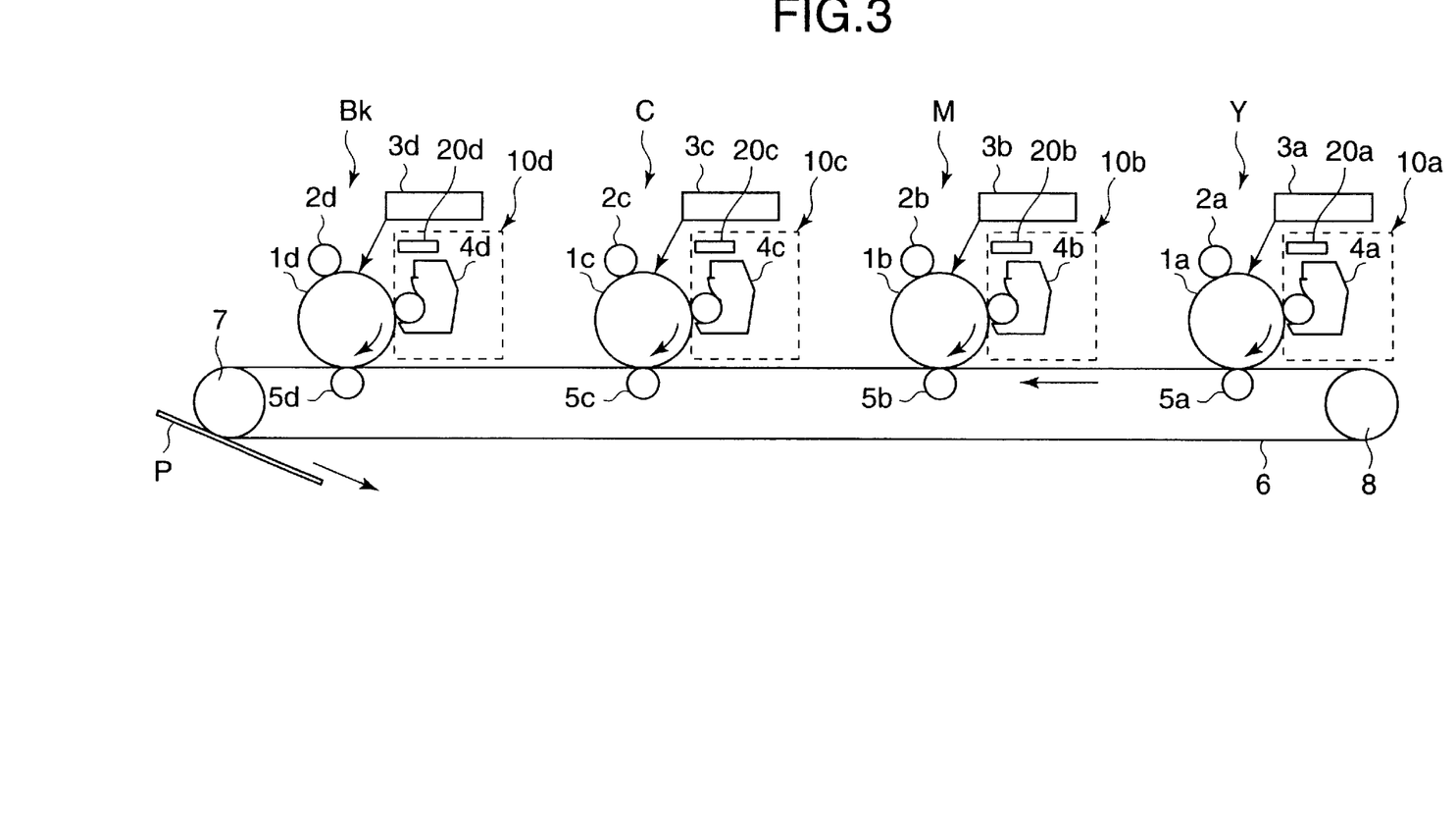
FIG. 3 shows the general construction of another embodiment of the image forming apparatus according to the present invention.

Further, in the image forming apparatus of the present invention, as shown in FIG. 3, it is possible to use cartridges 10a to 10d in which only the developing means 4a to 4d are detachably mountable with respect to the main body of the image forming apparatus.

Figure 4:
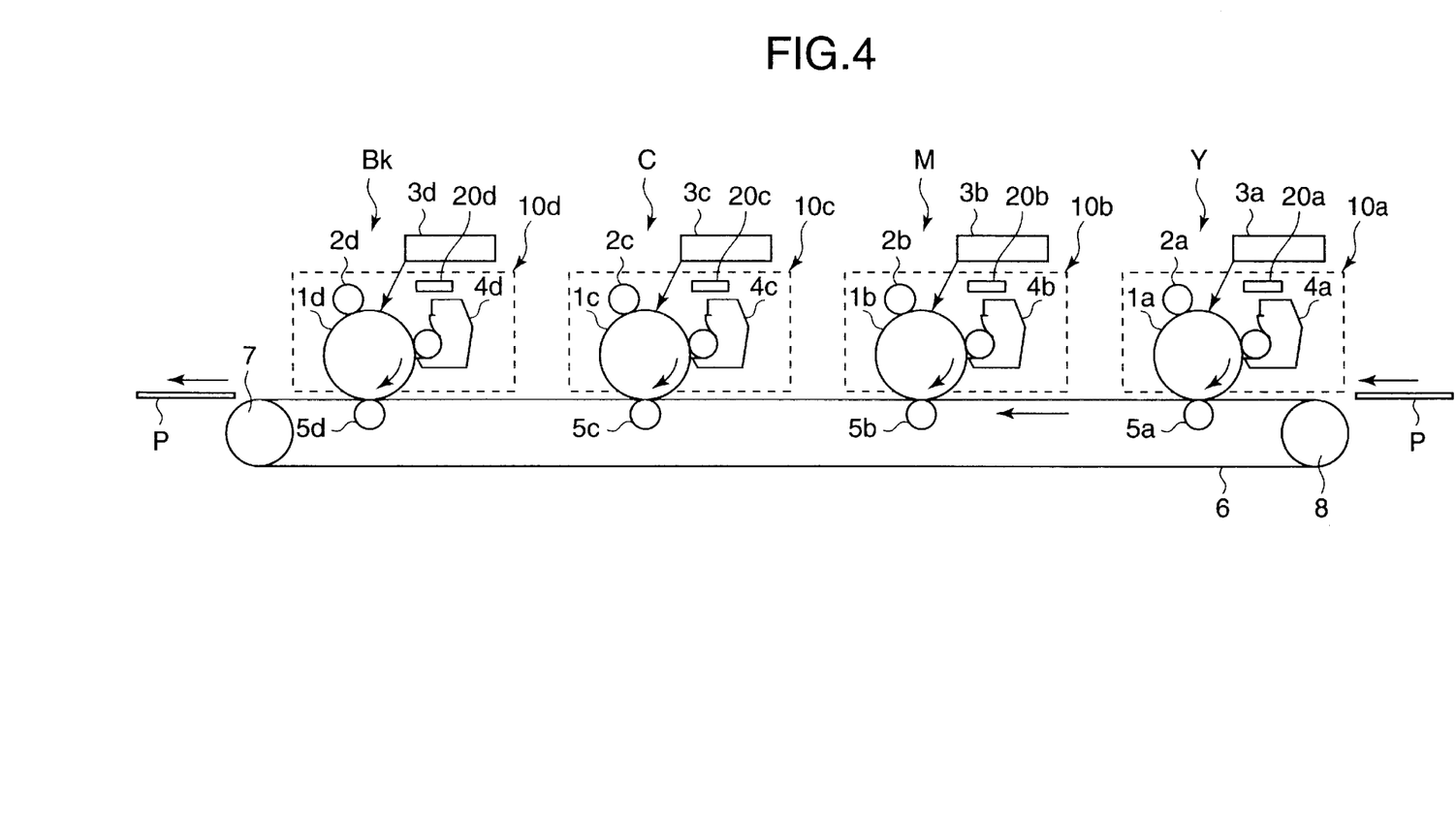
FIG. 4 shows the general construction of still another embodiment of the image forming apparatus according to the present invention.

Also, while in the above-described embodiments, the transferring member 6 for transferring thereto the toner images on image bearing members such as the photosensitive drums 1a to 1d has been described as an intermediate transferring member such as the intermediate transferring belt to which the toner images on the image bearing members are transferred, the present invention is not restricted thereto, but as shown in FIG. 4, use can also be made of a transferring member such as a transferring belt for carrying thereon and conveying the recording medium P to which the toner images on the image bearing members are transferred.

The present invention is not restricted to the above-described embodiments, but covers all modifications within the technical idea of the invention.

What is claimed is:

1. An image forming apparatus comprising:
   a plurality of image forming stations for forming an image on a recording material, each of said plurality of image forming stations having a memory; and
   writing means for writing data into said memories,
   wherein when the image is formed on the recording material without at least one of said image forming stations being used, said writing means writes use data into said memory of the station used and said memory of the station not used.

2. An image forming apparatus according to claim 1, wherein at least a portion of said image forming station and said memory are detachably mountable on a main body of the apparatus as a unit.

3. An image forming apparatus according to claim 2, wherein each of said image forming stations has an image bearing member, charging means for charging said image bearing member, image writing means for writing an image on said image bearing member, and developing means for developing a latent image formed on said image bearing member, and said memory is made into a unit together with at least said image bearing member.

4. An image forming apparatus according to claim 3, further comprising a second image bearing member for bearing thereon the image transferred from said image bearing member.

5. An image forming apparatus according to claim 4, wherein the image bearing members of said plurality of image forming stations are in contact with said second image bearing member.

6. An image forming apparatus according to claim 1, wherein the use data is data of number of prints.

7. A first unit mounted on an image forming apparatus, said image forming apparatus including a plurality of attaching means and being capable of forming an image using said first unit attached to said plurality of attaching means and a second unit, said first unit comprising:
   a memory,
   wherein said memory stores use data in a case where the image is formed by use of at least said first unit and use data in a case where the image is formed by use of not said first unit but said second unit.

8. A unit according to claim 7, wherein said image forming apparatus has a plurality of image forming stations and said first unit further comprises at least a portion of at least one of the image forming stations.

9. A unit according to claim 8, wherein each of said image forming stations has an image bearing member, charging means for charging said image bearing member, image writing means for writing an image on said image bearing member, and developing means for developing a latent image formed on said image bearing member, and said memory is made into a unit together with at least said image bearing member.

10. A unit according to claim 7, wherein the use data are data of numbers of prints.

11. An image forming apparatus comprising:
   an image forming station for forming an image on a recording material, said image forming station having a memory; and writing means for writing data into said memory, wherein said image forming station can form an image at at least two kinds of speeds, and said writing means writes use data into said memory for each of the image forming speeds.

12. An image forming apparatus according to claim 11, wherein at least a portion of said image forming station and said memory are detachably mountable on a main body of the apparatus as a unit.

13. An image forming apparatus according to claim 12, wherein said image forming station has an image bearing member, charging means for charging said image bearing member, image writing means for writing an image on said image bearing member, and developing means for developing a latent image formed on said image bearing member, and said memory is made into a unit together with at least said image bearing member.

14. An image forming apparatus according to claim 11, further comprising a second image bearing member for bearing thereon the image transferred from said image bearing member.

15. An image forming apparatus according to claim 14, wherein the image bearing member of said image forming station is in contact with said second image bearing member.

16. An image forming apparatus according to claim 11, wherein the use data is data of number of prints.

17. A unit detachably mountable on an image forming apparatus capable of forming an image at at least two kinds of image forming speeds, said unit comprising:

a memory, wherein said memory stores therein use data for each image forming speed.

18. A unit according to claim 17, wherein said image forming apparatus has an image forming station, and said unit further comprises at least a portion of the image forming station.

19. A unit according to claim 18, wherein said image forming station has an image bearing member, charging means for charging said image bearing member, image writing means for writing an image on said image bearing member, and developing means for developing a latent image formed on said image bearing member, and said memory is made into a unit together with at least said image bearing member.

20. A unit according to claim 17, wherein the use data is data of number of prints.

* * * * *

UNITED STATES PATENT AND TRADEMARK OFFICE
CERTIFICATE OF CORRECTION

PATENT NO.      : 6,493,519 B2
DATED           : December 10, 2002
INVENTOR(S)     : Hiroshi Sasame et al.

It is certified that error appears in the above-identified patent and that said Letters Patent is hereby corrected as shown below:

<u>Column 7,</u>
Line 12, "cart ridges" should read -- cartridges --.

Signed and Sealed this

Sixteenth Day of September, 2003

JAMES E. ROGAN
*Director of the United States Patent and Trademark Office*